United States Patent [19]
Wulff

[11] 3,930,630
[45] Jan. 6, 1976

[54] VACUUM CLEANER SUPPORT APPARATUS

[75] Inventor: Richard F. Wulff, Long Lake, Minn.

[73] Assignee: Advance Machine Company, Spring Park, Minn.

[22] Filed: Aug. 5, 1974

[21] Appl. No.: 494,520

[52] U.S. Cl. ............ 248/129; 248/137; 280/47.24; 280/47.36
[51] Int. Cl.² ......................................... B62B 3/08
[58] Field of Search .......... 248/129, 128, 134, 137, 248/133, 138, 130, 139; 280/47.17, 47.24, 47.26, 47.36, 47.37 R; 298/2; 259/176

[56] References Cited
UNITED STATES PATENTS

| 267,191 | 11/1882 | Gough | 248/133 X |
| 1,798,565 | 3/1931 | Trullinger | 248/129 |
| 1,937,668 | 12/1933 | Pine | 248/129 |
| 2,121,514 | 6/1938 | Waterman | 248/134 X |
| 2,291,984 | 8/1942 | Ponselle | 248/129 X |
| 2,683,012 | 7/1954 | Reinsma | 248/129 |
| 3,527,469 | 9/1970 | Gobin | 280/47.37 R |
| 3,658,383 | 4/1972 | Sisson | 280/47.36 X |
| 3,702,016 | 11/1972 | Keesee | 280/47.37 R X |

Primary Examiner—Roy D. Frazier
Assistant Examiner—Robert W. Gibson, Jr.
Attorney, Agent, or Firm—Wicks & Nemer

[57] ABSTRACT

Apparatus for supporting and tilting the collecting chamber of a vacuum cleaner is disclosed including a chassis rollable over a floor surface, having a pair of upstanding arms, a pair of arm members pivotally connected to the upstanding arms of the chassis, and a handle pivotally connected to the arm members. The handle can be locked in either of two positions, with the first push position being such that the gripping portion of the handle is placed above the pivot point of the arm member to the chassis such that the gripping portion is in a position convenient to the operator for rolling the chassis over the floor surface and with the second tilt position being rotated from the first push position about the pivotal connection of the handle with the arm members such that the gripping portion lies below the pivot point to allow pivoting of the arm members on the chassis to tilt the collecting chamber of the vacuum cleaner so that it empties the contents therefrom.

10 Claims, 7 Drawing Figures

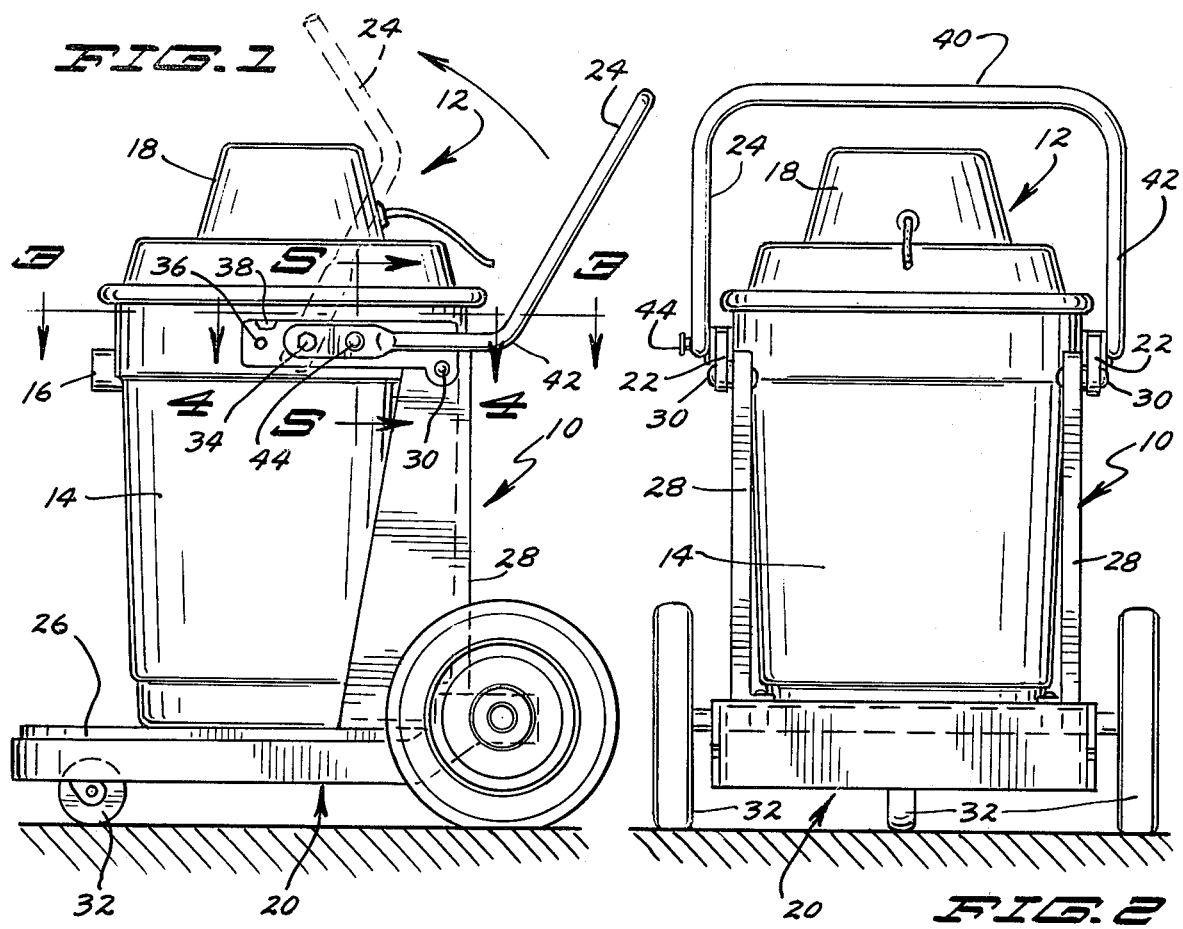
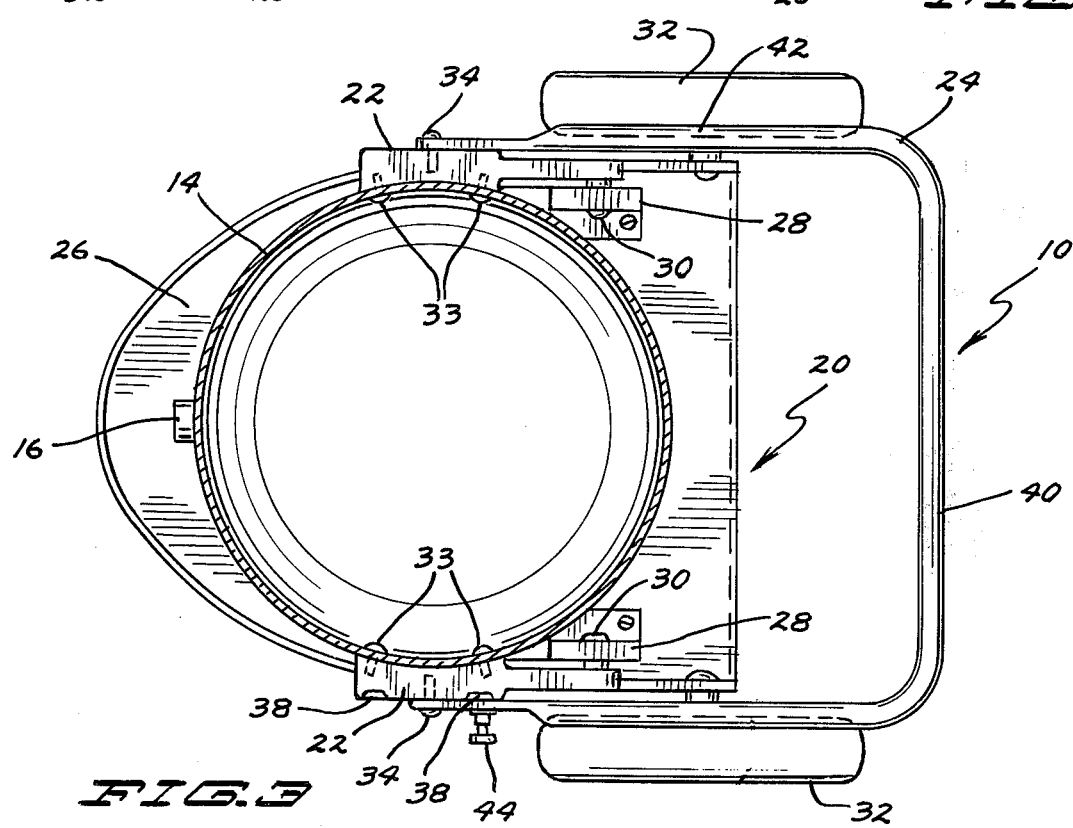

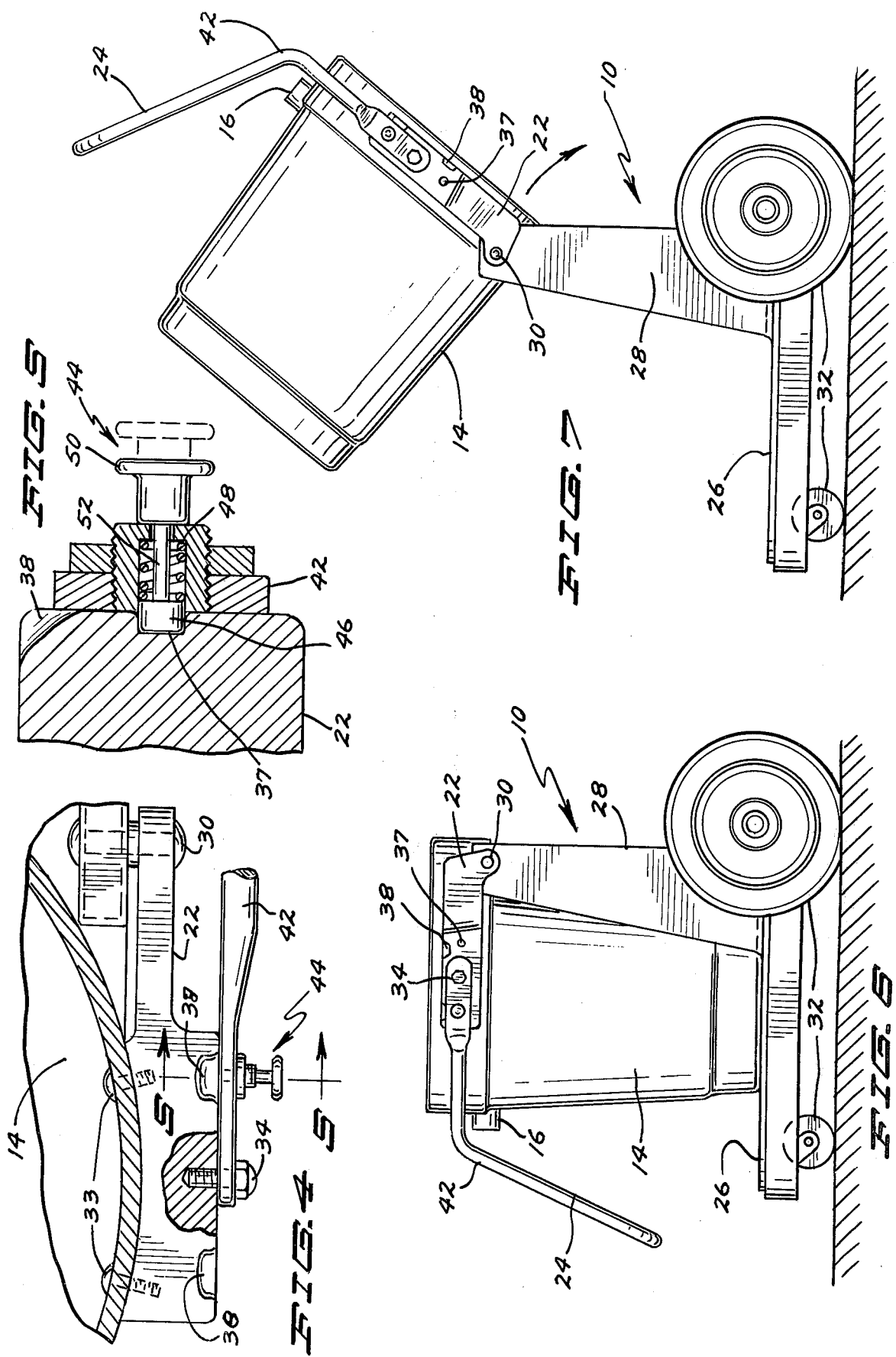

VACUUM CLEANER SUPPORT APPARATUS

SUMMARY OF THE INVENTION

The invention relates to an improvement in vacuum cleaners and particularly to the apparatus for supporting and allowing the tilting of the collecting chamber of a vacuum cleaner.

It is an object of the present invention to provide an apparatus having a handle which can be selectively positioned in a first push position for pushing the chassis of a vacuum cleaner support about a floor surface and a second tilt position for allowing the tilting of the collecting chamber of a vacuum cleaner.

It is also an object of the present invention to provide an apparatus for the support and tilting of the collecting chamber of a vacuum cleaner of relatively few parts and simple design.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

DESCRIPTION OF DRAWINGS

FIG. 1 is a side view of apparatus according to the present invention including a vacuum cleaner.

FIG. 2 shows a rear view of the apparatus of FIG. 1 with the handle shown in a first push position.

FIG. 3 is a top view of the apparatus of FIG. 1 with the vacuum unit removed.

FIG. 4 is a sectional view of the apparatus of FIG. 1, according to the section line 4—4 in FIG. 1.

FIG. 5 is a sectional view of the apparatus of FIG. 1, according to the section line 5—5 in FIGS. 1 and 4.

FIG. 6 is a side view of the apparatus of FIG. 1 with the handle in a second tilt position.

FIG. 7 is a side view of the apparatus of FIG. 6 with the collecting chamber in a pivoted position.

DESCRIPTION

Referring to the drawings in detail, the apparatus according to the present invention, generally designated 10, is shown together with the vacuum cleaner 12 which may be of a conventional design. Vacuum cleaner 12 includes the collecting chamber 14 having a suitable inlet 16 having provisions for attachment of a hose, not shown, thereon. A vacuum creating unit 18 is operatively engaged with chamber 14 to place chamber 14 of the vacuum cleaner 12 in a vacuum condition to thereby cause suction through the hose, as is well known in the art.

Apparatus 10 according to the present invention also includes a chassis 20, a pair of horizontal arm members 22 pivotally mounted to chassis 20, and handle 24 pivotally interconnected to chassis 20 and arm members 22 as described further hereinafter.

Chassis 20 includes a flat surface 26 having provisions for allowing the placement of collecting chamber 14 thereon and a pair of upright arms 28 extending from the rear of flat surface 26 adjacent the handle 24. Arm members 22 pivot with respect to chassis 20 about point 30 located on the uppermost portion of upright arms 28 of chassis 20. Suitable wheels 32, such as a front caster and tires as shown, can be attached to chassis 20 to allow movement of chassis 20 upon the floor surface.

Handle 24 is pivotally interconnected to chassis 20 and arm members 22 by pivot point 34. Handle 24 includes a gripping portion 40 and an offset L-shaped, angular extension 42.

As best seen in FIG. 4, arm members 22 include screws 33 which extend through collecting chamber 14 to attach chamber 14 to arm members 22. Apertures or bores 36 and 37 are located on arm members 22 on a diameter drawn through pivot point 34. Notches 38, whose purpose will be explained hereinafter, lie on the arc drawn through bores 36, 37 about center pivot 34 adjacent the edges of arm members 22.

A detent member 44 is carried by extension 42. As best seen in FIGS. 4 and 5, detent member 44 includes a detent 46, of a size corresponding to bores 36 and 37 of arm member 22. Detent 46 is biased outwardly toward bores 36 and 37 of arm member 22 by a spring 48 and a handle 50 is connected to detent member 46 by an interconnecting shaft 52. Therefore, detent 46 can be moved in a direction opposite to the bias of spring 48 by the manual movement of handle 50.

In operating the apparatus of the present invention, when it is desired to empty the collecting chamber 14, the operator removes vacuum unit 18 from vacuum cleaner 12. The operator then grasps the knob 50 and pulls it backwards causing the detent 46 to be removed from bore 37 of arm member 22. At this time handle 24 can be pivoted about pivot point 34 on arm members 22 as shown in phantom in FIG. 1. After handle 24 is pivoted in such a position that detent 46 is located away from bore 37, knob 50 can then be released such that detent 46 moves outwardly under the bias of spring 48. Handle 24 is continued in its rotation about pivot point 34 until detent 46 abuts notch 38. Upon further rotation detent 46 cams against notch 38 such that detent 46 moves inwardly against the bias of spring 48. Handle 24 is then further pivoted until detent 46 is positioned in the entrance of bore 36. At this time, detent 46 will move outwardly into bore 36 of arm member 22 due to the biasing of spring 48. Therefore, handle 24 can be locked in the second tilt position shown in FIG. 6.

In the second tilt position shown in FIG. 6, gripping portion 40 is located below pivot point 30 of arm members 22 and chassis 20. The operator then raises gripping portion 40 such that arm members 22 pivot about point 30 where arm members 22 can be pivoted to the position shown in FIG. 7. In such a position, the material collected during the vacuum operation pours from container 14 to thereby easily empty the contents of the chamber. As can be seen in FIG. 7, handle 24 is out of the way of the chassis 20 and of the material falling from the chamber 14.

It can now be appreciated that the contents of chamber 14 can be emptied with the expenditure of a small amount of force. With the gripping portion 40 of handle 24 located below the pivot point 30, the gripping portion 40 of handle 24 is in a position convenient to the operator for tilting chamber 14, and also there exists a force advantage due to the leverage obtained from the relation of the pivot point 30 and gripping portion 40. Since during the normal course of cleaning, chamber 14 is filled with a variety of material such as water, the weight of the contents can be considerable.

However, due to the leverage and convenience obtained from apparatus 10 of the present invention, chamber 14 can easily be tilted with a small amount of force to empty the contents therein.

After the contents of chamber 14 have been emptied, chamber 14 can be pivoted back to the position shown in FIG. 6. The operator can then grasp knob 50, thus pulling detent 46 from bore 36. At this time handle 24 can be pivoted as shown in phantom in FIG. 1 such that detent 46 is located outside of bore 36. At this time knob 50 can be released and detent 46 will move outwardly due to the bias of spring 48. Handle 24 is rotated about pivot point 34 until detent 46 contacts notch 38. Upon continued rotation of handle 24, detent 46 is moved inwardly away from arm member 22 in a direction opposite to that of the bias of spring 48. The handle is further pivoted until detent 46 moves into bore 37 under the bias of spring 48. At this time handle 24 is locked in a first push position shown in FIG. 1.

In the first push position shown in FIG. 1, gripping portion 40 of handle 24 is located above pivot point 30 of arm members 22 and chassis 20. In the first push position chassis 20 can be easily moved by applying a force to handle 24 which is conveyed to the chassis 20 to cause rotation of the wheels 32 upon the floor surface. In such a position, handle 24 is in a convenient location for the operator to push the apparatus 10 and vacuum cleaner 12 in a very simple manner.

The invention is not to be understood as being restricted to the details set forth since these may be modified in the scope of dependent claims without departing from the spirit and scope of the invention. For example, in the preferred embodiment, a single detent member 44 is shown on one side of handle 24. While provisions are provided in the present embodiment for detent member 44 on both arm members 22 although only one detent member 44 is shown, for ease of manufacture, arm members 22 need not be identical. It would be obvious to have detent members 44 placed on both sides of handle 24 or to have one side of handle 24 equipped with a frictional ball detent while the other side includes a detent member 44 as previously described.

Additionally, arm members 22 can be cut in two pieces such that the first portion of arm members 22 is for pivotally mounting handle 24 to the chamber 14, and the second portion for pivotally mounting container 14 to chassis 20.

Having thus described the invention, what I claim as new and desire to secure by Letters Patent is:

1. Apparatus for tilting the collecting chamber of a vacuum cleaner comprising in combination:
   a. a chassis;
   b. first means for allowing movement of the chassis over a floor surface;
   c. second means for pivotally mounting the collecting chamber to the chassis about a pivot point;
   d. a handle having a gripping portion;
   e. third means for pivotally interconnecting the handle to the second means; and
   f. fourth means for locking the handle relative to said second means in a first push position and a second tilt position, the first push position allowing the application of a force to the gripping portion of the handle to be transferred to the chassis to cause movement of the chassis over the floor surface, and the second tilt position being rotated from the first push position to allow the application of a force to the gripping portion to pivot the second means about the pivot point to therefore tilt the collecting chamber to allow emptying the contents therefrom.

2. The apparatus of claim 1, wherein the handle includes an angular extension which is pivotally mounted on the second means such that in the first push position, the gripping portion of the handle is placed above the pivot point of the second means and the chassis and in the second tilt position, the gripping portion of the handle lies below the pivot point of the second means and the chassis creating a force advantage due to the leverage obtained and such that gripping portion of the handle is in a convenient position for tilting the collecting chamber.

3. The apparatus of claim 2, wherein the second means includes arm members connected to the collecting chamber and pivotable about the pivot point.

4. The apparatus of claim 3, wherein the chassis includes a flat surface and a pair of upright arms extending from the rear of the flat surface adjacent the handle and the pivot point is located on the uppermost portion of the two upstanding arms.

5. The apparatus of claim 4, wherein the second means includes at least two apertures and the fourth means includes at least one biased detent mechanism carried by the handle which extends into the apertures of the second means to selectively lock the handle in the first push and second tilt positions.

6. The apparatus of claim 5, wherein the arm members connected to the chamber are horizontal, the arm members include notches for camming the detent mechanism in a direction opposite to the bias of the detent mechanism, and the angular extension of the handle is offset L-shaped.

7. The apparatus of claim 2, wherein the second means includes at least two apertures and the fourth means includes at least one biased detent mechanism carried by the handle which extends into the apertures of the second means to selectively lock the handle in the first push and second tilt positions.

8. The apparatus of claim 1, wherein the chassis includes a flat surface and a pair of upright arms extending from the rear of the flat surface adjacent the handle and the pivot point is located on the uppermost portion of the two upstanding arms.

9. The apparatus of claim 7, wherein the second means includes arm members connected to the collecting chamber and pivotable about the pivot point.

10. The apparatus of claim 1, wherein the second means includes at least two apertures and the fourth means includes at least one biased detent mechanism carried by the handle which extends into the apertures of the second means to selectively lock the handle in the first push and second tilt positions.

* * * * *